(12) United States Patent
Boss et al.

(10) Patent No.: US 8,589,917 B2
(45) Date of Patent: Nov. 19, 2013

(54) TECHNIQUES FOR TRANSFERRING INFORMATION BETWEEN VIRTUAL MACHINES

(75) Inventors: Gregory Jensen Boss, American Fork, UT (US); Vincenzo Valentino DiLuoffo, Sandy Hook, CT (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1572 days.

(21) Appl. No.: 11/539,883

(22) Filed: Oct. 10, 2006

(65) Prior Publication Data

US 2008/0086725 A1 Apr. 10, 2008

(51) Int. Cl.
- *G06F 15/16* (2006.01)
- *G06F 15/167* (2006.01)
- *G06F 15/173* (2006.01)
- *G06F 3/00* (2006.01)

(52) U.S. Cl.
USPC .............. 718/1; 709/201; 709/202; 709/203; 709/204; 709/212; 709/238; 710/20; 710/21; 719/319; 719/329; 715/748

(58) Field of Classification Search
None
See application file for complete search history.

(56) References Cited

U.S. PATENT DOCUMENTS

| | | | |
|---|---|---|---|
| 5,077,654 A | 12/1991 | Ohtsuki | |
| 5,088,031 A | 2/1992 | Takasaki et al. | |
| 5,341,484 A | 8/1994 | Tanaka et al. | |
| 6,195,650 B1 | 2/2001 | Gaither et al. | |
| 6,681,267 B2 | 1/2004 | Ohmura et al. | |
| 6,886,159 B2 | 4/2005 | Onodera | |
| 6,934,755 B1 | 8/2005 | Saulpaugh et al. | |
| 6,944,699 B1 * | 9/2005 | Bugnion et al. | 710/269 |
| 7,228,337 B1 * | 6/2007 | Bornstein et al. | 709/217 |
| 7,392,345 B2 * | 6/2008 | Pardikar et al. | 711/121 |
| 7,424,710 B1 * | 9/2008 | Nelson et al. | 718/1 |
| 7,721,299 B2 * | 5/2010 | van Riel | 719/319 |
| 2002/0049869 A1 | 4/2002 | Ohmura et al. | |
| 2004/0205701 A1 | 10/2004 | Onodera | |
| 2005/0108709 A1 * | 5/2005 | Sciandra et al. | 718/1 |
| 2005/0114855 A1 * | 5/2005 | Baumberger | 718/1 |
| 2005/0132367 A1 * | 6/2005 | Tewari et al. | 718/1 |
| 2006/0149899 A1 * | 7/2006 | Zimmer et al. | 711/112 |
| 2007/0294690 A1 * | 12/2007 | Taillefer et al. | 718/1 |
| 2008/0002663 A1 * | 1/2008 | Tripathi et al. | 370/351 |
| 2008/0080512 A1 * | 4/2008 | Gofman et al. | 370/392 |

* cited by examiner

*Primary Examiner* — Emerson Puente
*Assistant Examiner* — Adam Lee
(74) *Attorney, Agent, or Firm* — Schmeiser, Olsen & Watts, LLP; Mark C. Vallone (57) ABSTRACT

A method, system, and program product transfer information from a guest virtual machine running on a host machine to a receiving machine. A monitor intercepts a request to transfer information from a sending machine, which is a guest virtual machine located on the host system, to a receiving machine. If the receiving machine is a guest virtual machine running on the host machine, the information is transferred to memory associated with the receiving machine. If, the receiving machine is not a guest virtual machine located on the host system, the information is transferred to a network.

18 Claims, 6 Drawing Sheets

FIG. 6

TECHNIQUES FOR TRANSFERRING INFORMATION BETWEEN VIRTUAL MACHINES

FIELD OF THE INVENTION

The present invention relates generally to the field of information transfer between computer systems. More particularly, the present invention relates to the transfer of information from a guest virtual machine running on a host machine to a receiving machine, in which the receiving machine may or may not be a guest virtual machine running on the same host system as the sending machine.

BACKGROUND OF THE INVENTION

Organizations rely on the computing infrastructure to provide a broad array of services. To meet the demand to employ, maintain, and grow these services, IT organizations must continue adding new servers to increase computing capacity. However, as a consequence of purchasing new servers, organizations based growing server sprawl that presents challenges that include rising costs, decreasing manageability, and decreasing business.

IT budgets are continually scrutinized by corporate managers and shareholders. As a result, emphasis has been placed on cost take out to reduce these ever expanding IT budgets.

One solution to server sprawl and increased IT budgets is virtualization. Virtualization makes it possible to package a complete server including hardware, operating system, applications, and configurations, into a portable virtual machine package. Multiple virtual machines can then be run simultaneously and independent on a single physical server. This is possible because a virtualization layer provides each virtual machine a complete virtual hardware configuration while managing the sharing of server resources among virtual machines. With virtualization, each workload that previously required a dedicated physical server can be placed in a virtual machine, making it simple to consolidate multiple workloads onto each physical server.

Server virtualization has been gaining more market share as a viable way to provide cost takeout. Products, such as VMWare™, by the EMC Corporation, and Virtualization Engine™, by IBM, consolidate numerous physical servers into a single host server with scores of guest operating systems running under a virtual server.

Despite improvements in cost and efficiency provided by virtualization, the need to share information between guest virtual machines running on the same host system has not been addressed. File and information transfer between consolidated server systems still happens historically and typically over the LAN or WAN. This fact has not changed, even though some of these virtual images now physically reside on the same host server.

The current state of information transfer between guest virtual machines residing on the same physical server is illustrated with reference to FIG. 1. Each guest virtual machine operating system is encapsulated into file 101 stored in host operating system storage 103. Each operating system image 101 has associated therewith image storage 105.

Figure 1:
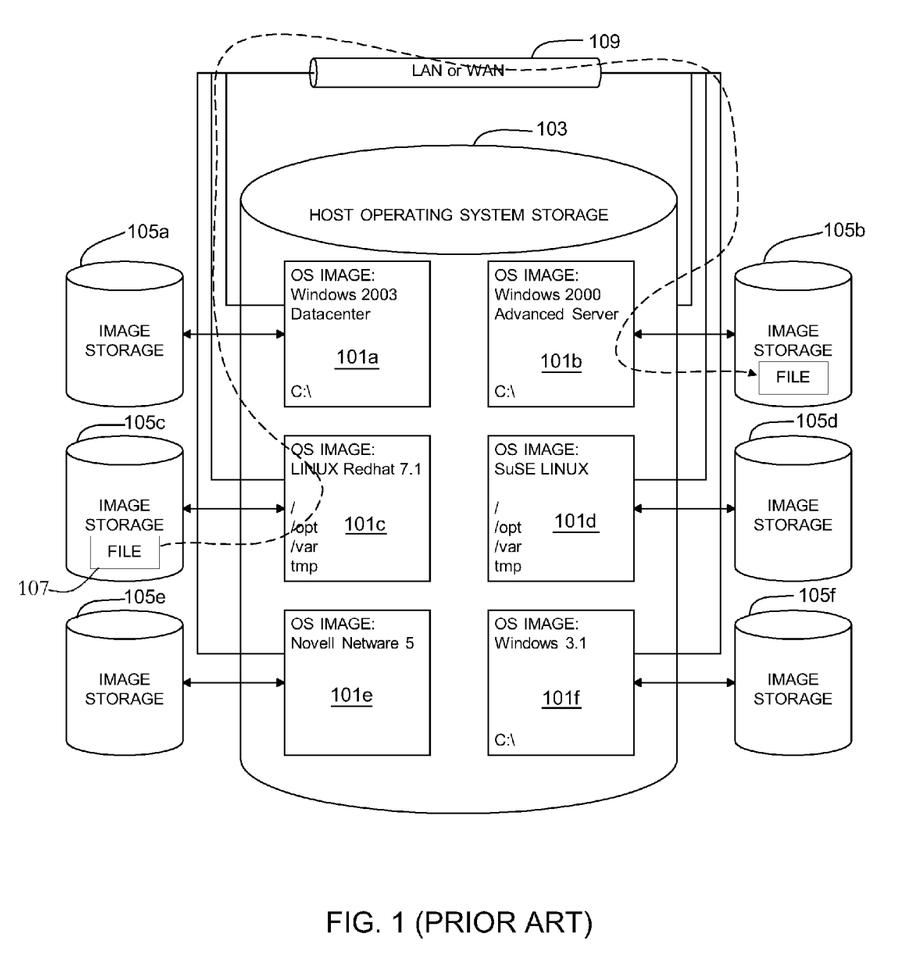
FIG. 1 illustrates the transfer of information between guest virtual machines on a host machine according to the prior art.

In FIG. 1, there is illustrated the transfer of a file 107 from image storage 105c to image storage 105b. File 107 may be transferred using any number of well known file transfer protocols, such as FTP, Windows File Sharing, CIFS, NFS, SCP, and others. Operating system image 101c passes file 107 to a virtual protocol stack (not shown) provided by the virtualization infrastructure, and thence to a LAN or WAN 109. File 107 is received at the host, passed back through the protocol stack, and then to operating system image 101b, and then to image storage 105b. Thus, network resources are consumed simply transferring file 107 from one location and host operating system storage 103 to another location in host operating system storage 103.

As long as the virtual images are located on the same physical host server, there is, in theory no requirement or limitation to move information outside of the virtual image over a LAN/WAN into another virtual image located on the same physical host server. Additionally, using traditional file transfer technique consumes LAN/WAN network resources unnecessarily. It is commonplace to find LAN and WAN bottlenecks or high utilization, and removing unnecessary consumption of this resource presents a significant saving in LAN cost. The final drawback for existing solutions is that the transfer of data over the LAN/WAN link is time consuming and typically slower than a direct disc to disc transfer within a bus. A typical LAN connection might entail a 100 mbps Ethernet topology. A fast disc sub system, shared by two or more virtual servers is loaded only by the speed at which the disc spins and the speed at which the drive heads can move. This can typically range between 150 mbps to over 200 mbps, the difference depending on the disc technology used. In these cases, the transfer is more than four times slower using existing known technology. For large data transfers, which are the typical, this can translate into significant time delays.

SUMMARY OF THE INVENTION

The present invention provides a method, system, and program product for transferring information from a guest virtual machine, running on a host machine, to a receiving machine. A method of the present invention intercepts a request to transfer information from a sending machine, which is a guest virtual machine located on the host system, to a receiving machine. If the receiving machine is a guest virtual machine running on the host machine, the method transfers the information to memory associated with said receiving machine. If, on the other hand, the receiving machine is not a guest virtual machine located on the host system, the method transfers the information to a network.

An embodiment of a system according to the present invention includes a host system upon which a plurality of guest virtual machines may be running. A monitor intercepts information sent by the guest virtual machines to a network. The monitor determines if information sent by a guest virtual machine to the network is intended to be transferred to a receiving guest virtual machine running on the host system. If so, then the system transfers the information to storage associated with the receiving guest virtual machine. If not, then the system transfers the request to the network.

DETAILED DESCRIPTION

Figure 2:
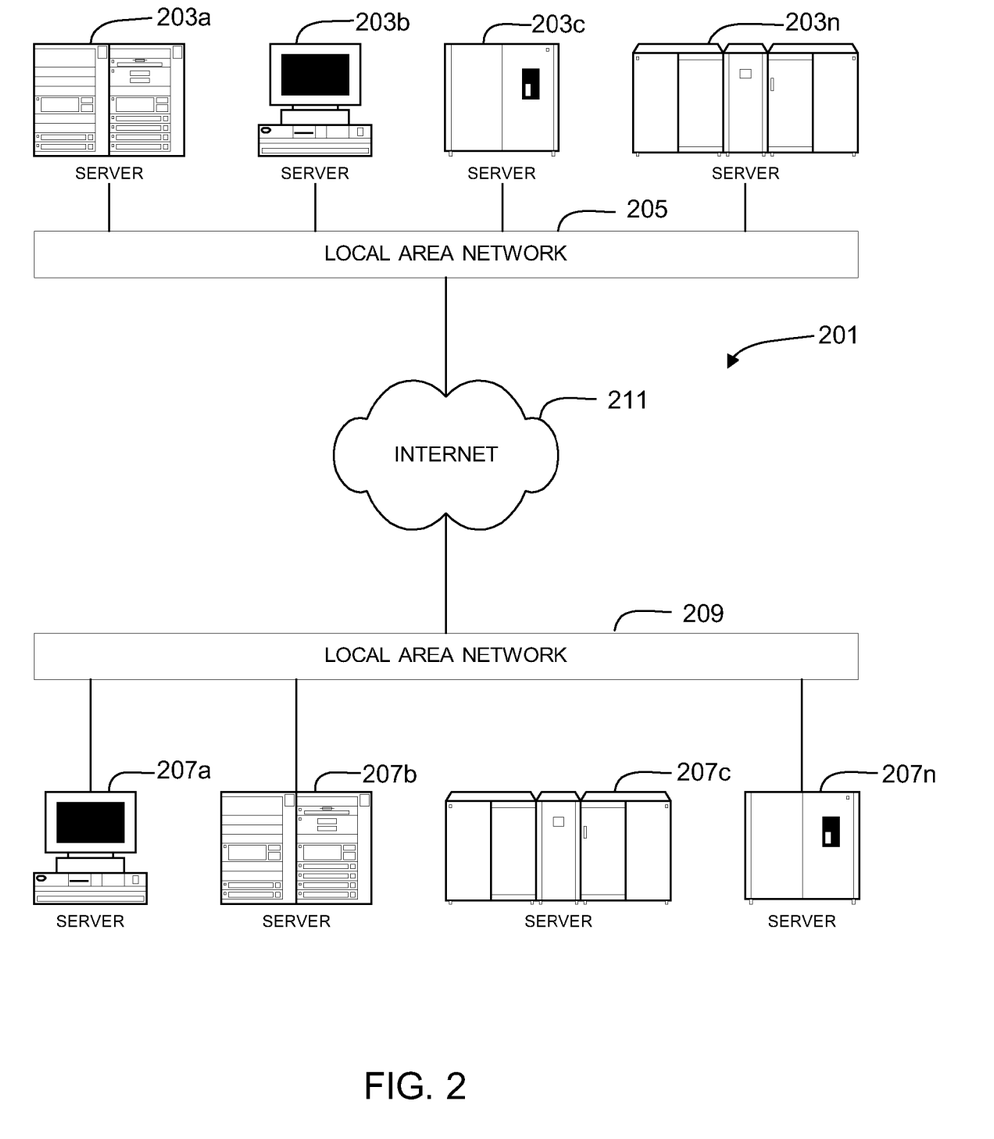
FIG. 2 is a block diagram of a system of interconnected computers.

Referring now to FIG. 2, a network of computers is designated generally by the numeral 201. A plurality of servers 203 are connected to a first local area network 205. Servers 203 may be personal computers or workstations, midrange systems, or large systems. Servers 203 are connected to local area network 205 through well known network interfaces.

A plurality of servers 207 are connected to a second local area network 209. Local area networks 205 and 207 may be connected to the internet 211 in a manner well known to those skilled in the art. Servers 203 can communicate with each other over local area network 205. Similarly, servers 207 can communicate with each other over local area network 209. Servers 203 and 207 can communicate with each other across the internet 211.

Figure 3:
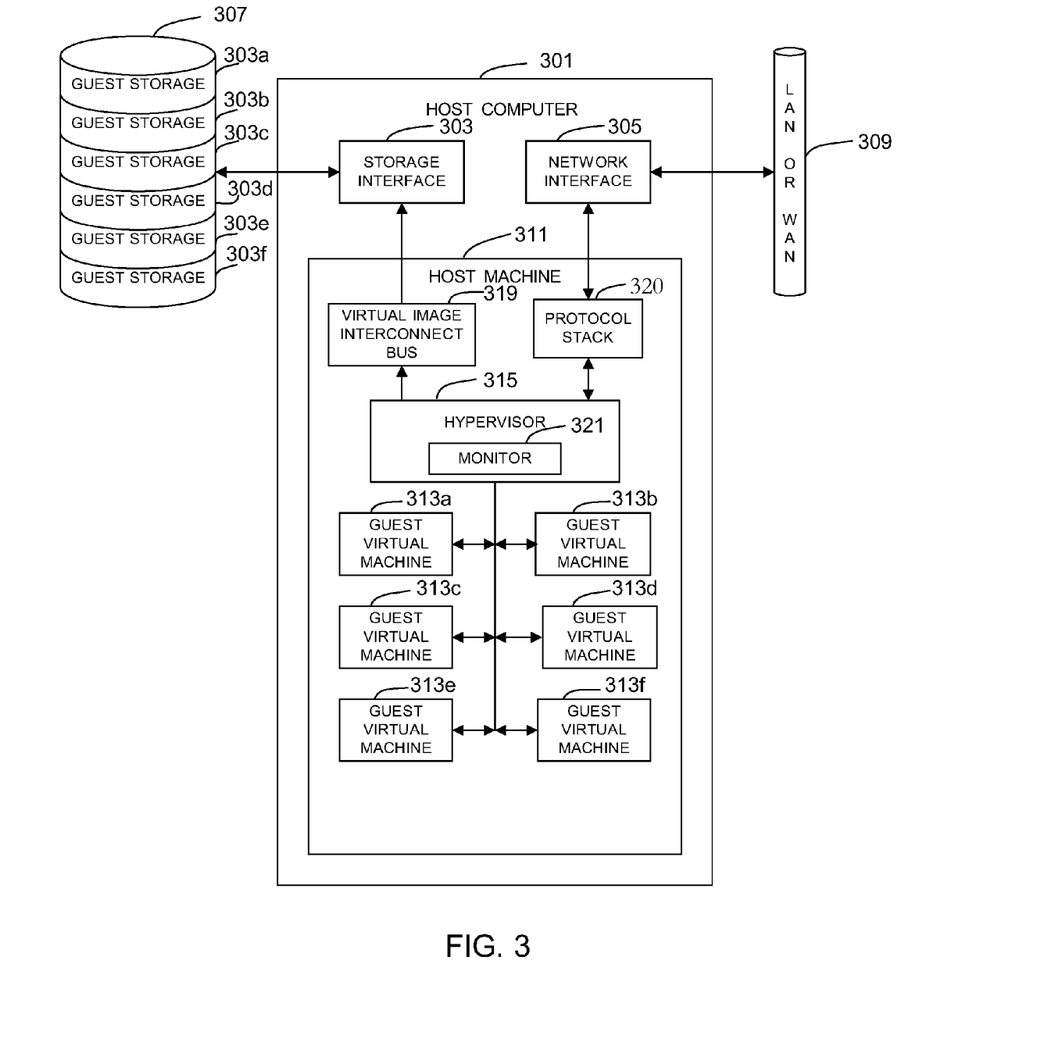
FIG. 3 is a block diagram of a system according to an embodiment of the present invention.

Referring now to FIG. 3, there is illustrated a block diagram of a system according to the present invention. A physical host computer is designated by the numeral 301. As will be described in detail hereinafter, host computer 301 includes various well known hardware, such as a central processing unit and memory (neither shown). As shown in FIG. 3, host computer 301 includes a storage interface 303 and a network interface 305. Storage interface 303 is coupled to disc storage 307, which may be onboard host computer 301 or remote from host computer 301, such as a storage area network (SAN). Network interface 305 is coupled to a local area network or wide area network 309.

A host machine 311, which is implemented in software, runs on host computer 301. A plurality of guest virtual machines 313 run within host machine 311. Each guest virtual machine includes an instance of an operating system and one or more applications running on the operating system.

Host machine 311 includes a hypervisor 315. Hypervisor 315 is a software component that manages resources for the guest virtual machines 313 and allows the operating systems of guest virtual machines 313 to run unmodified in host machine 311 at the same time. Hypervisor 315 is coupled to a protocol stack 320, which in turn is coupled to network interface 305.

According to the present invention, hypervisor 315 is also coupled to a virtual image interconnect bus 319. Virtual image interconnect bus 319 is coupled to storage interface 303. Hypervisor 315 includes a monitor 321. As will be explained in detail hereinafter, monitor 321 monitors and intercepts requests to transfer information from guest virtual machines 313 to other machines.

Figure 4:
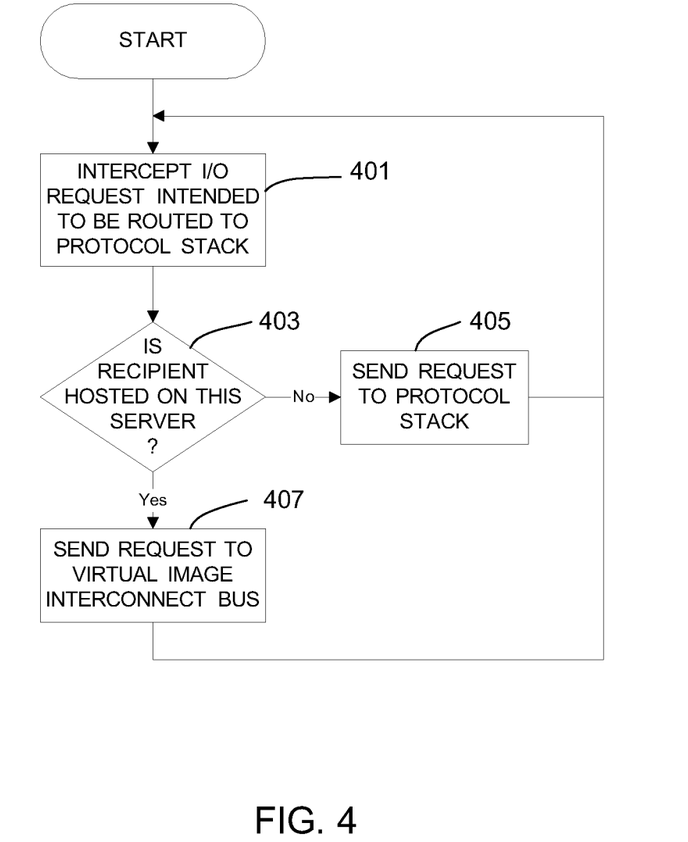
FIG. 4 is a flow chart of information transfer request monitoring and processing according to an embodiment of the present invention

Referring now to FIG. 4, there is illustrated an embodiment of processing by monitor 321 and hypervisor 315. Monitor 321 intercepts an I/O request intended to be routed to the protocol stack 320, at block 401. Monitor 321 tests at decision block 403 if the recipient is hosted on this server. If not, hypervisor 315 sends the request to the protocol stack 320, at block 405. If, on the other hand, the recipient is hosted on this server, then the hypervisor 315 handles the request as a file I/O and sends the request to the virtual image interconnect bus 319 at block 407.

Referring again to FIG. 3, storage 307 includes guest storage partitions 303a-303f. Each guest storage partition 303a-303f is associated with a guest virtual machine 313. When hypervisor 315 sends information to virtual image interconnect bus 319, virtual image interconnect bus 319 copies the information to the appropriate guest storage partition 303a-303f through storage interface 303.

Figure 5:
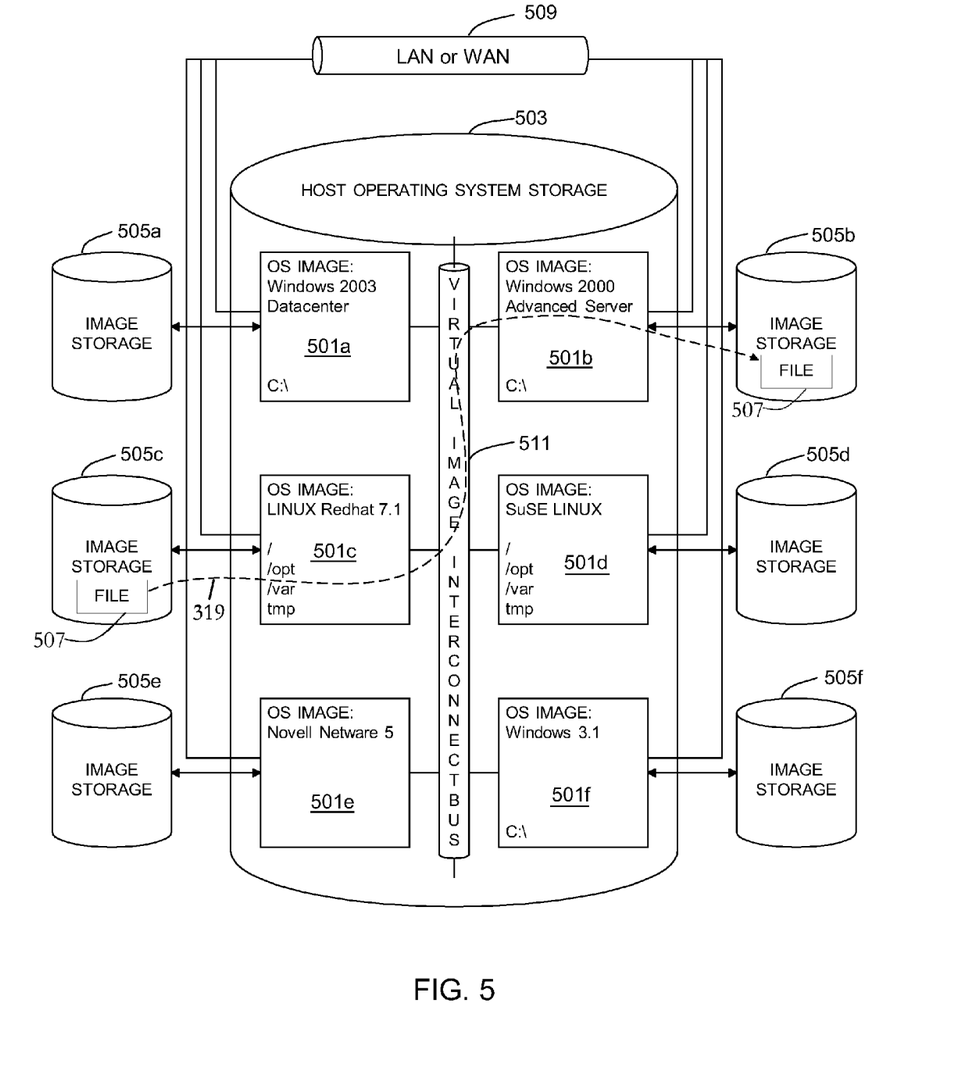
FIG. 5 is an illustration of the transfer of information between guest virtual machines located on the same host machine according to an embodiment of the present invention.

Referring now to FIG. 5, there is illustrated the operation of an embodiment of the present invention. FIG. 5 is similar to FIG. 1 except that FIG. 5 includes a virtual image interconnect bus 511. In FIG. 5, a file 507 is transferred from image storage 505c associated with operating system image 501c to image storage 505b, which is associated with operating system image 501b. However, instead of being across LAN 509, file 507 is transferred directly from image storage 505c to image storage 505b through virtual image interconnect 511.

Figure 6:
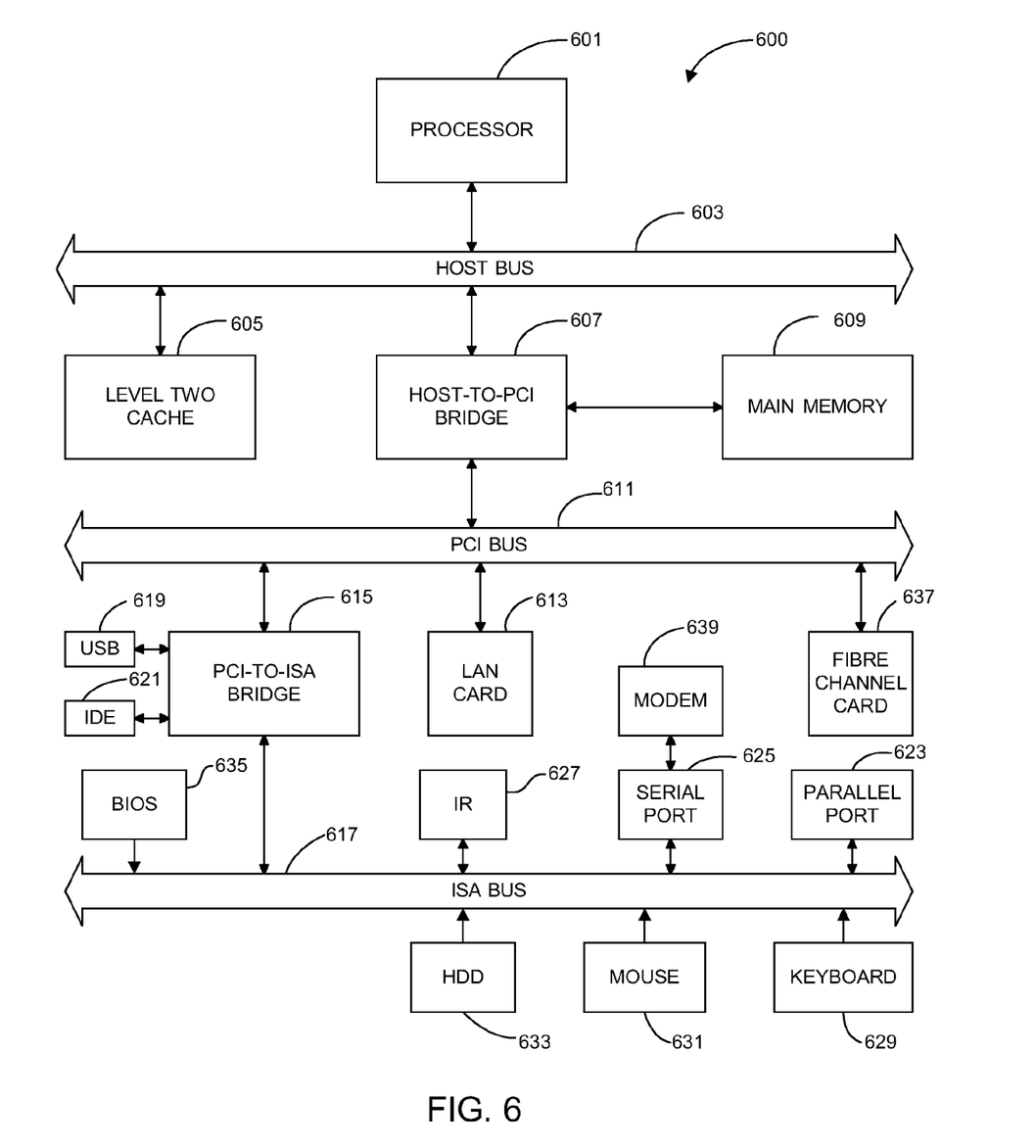
FIG. 6 is a block diagram of an information handling system adapted to implement components of a system according to the present invention.

Referring now to FIG. 6, there is illustrated a block diagram of a generic information handling system 600 capable of performing the server and client operations described herein. Computer system 600 includes processor 601 which is coupled to host bus 603. Processor 601 preferably includes an onboard cache memory. A level two (L2) cache memory 605 is also coupled to host bus 603. A Host-to-PCI bridge 607 is coupled to host bus 603. Host-to-PCI bridge 607, which is coupled to main memory 609, includes its own cache memory and main memory control functions. Host-to-PCI bridge 607 provides bus control to handle transfers among a PCI bus 611, processor 601, L2 cache 605, main memory 609, and host bus 603. PCI bus 611 provides an interface for a variety of devices including, for example, a local area network (LAN) card 613, a PCI-to-ISA bridge 615, which provides bus control to handle transfers between PCI bus 611 and an ISA bus 617, a universal serial bus (USB) 619, and an IDE device 621. PCI-to-ISA bridge 615 also includes onboard power management functionality. PCI-to-ISA bridge 615 can include other functional elements not shown, such as a real-time clock (RTC), DMA control, interrupt support, and system management bus support.

Peripheral devices and input/output (I/O) devices can be attached to various interfaces or ports coupled to ISA bus 617. Such interfaces or ports may include a parallel port 623, a serial port 625, an infrared (IR) interface 627, a keyboard interface 629, a mouse interface 631, and a hard disk drive (HDD) 633.

A BIOS 635 is coupled to ISA bus 617. BIOS 635 incorporates the necessary processor executable code for a variety of low-level system functions and system boot functions. BIOS 635 can be stored in any computer readable medium, including magnetic storage media, optical storage media, flash memory, random access memory, read only memory, and communications media conveying signals encoding the instructions (e.g., signals from a network). In order to couple computer system 600 to another computer system to copy files or send and receive messages over a network, LAN card 613 may be coupled to PCI bus 611. Similarly, a Fibre Channel card may be coupled to PCI bus 613. Additionally, a modem 639 may be coupled to ISA bus 617 through serial port 625 to support dial-up connections.

While the computer system described in FIG. 6 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

What is claimed is:

1. A method for transferring data between guest virtual machines, said method comprising:
    a processor of a host computer system intercepting, using a hypervisor, a request to transfer a file from a first machine to a second machine, said first machine being a first guest virtual machine located on the host computer system;
    after said intercepting, said processor ascertaining that the second machine is a second guest virtual machine located on the host computer system; and
    in response to said ascertaining, said processor:
        (i) transferring the file from image storage of the first guest virtual machine to an operating system image of the first guest virtual machine,
        (ii) directly transferring the file from the operating system image of the first guest virtual machine to an operating system image of the second guest virtual machine via a virtual machine interconnect bus within the host computer system, and
        (iii) transferring the file from the operating system image of the second guest virtual machine to image storage of the second guest virtual machine.

2. The method of claim 1, said method further comprising:
    in further response to said ascertaining, said processor sending the request to the virtual machine interconnect bus.

3. The method of claim 1, said method further comprising:
    said processor determining whether the second machine is the second guest virtual machine located on the host computer system,
    wherein said determining whether the second machine is the second guest virtual machine located on the host computer system comprises said ascertaining.

4. The method of claim 1, wherein the image storage of the first guest virtual machine and the image storage of the second guest virtual machine are specific to the first guest virtual machine and the second guest virtual machine, respectively.

5. The method of claim 1, wherein the image storage of the first guest virtual machine and the image storage of the second guest virtual machine are different partitions of a data store.

6. The method of claim 1, wherein said hypervisor includes a monitor component, and wherein said processor uses the monitor component to perform said intercepting.

7. A computer program product, comprising a computer readable hardware storage device having a computer readable program code stored therein, said program code configured to be executed by a processor of a computer system to implement a method for transferring data between guest virtual machines, said method comprising:
    said processor intercepting, using a hypervisor, a request to transfer a file from a first machine to a second machine, said first machine being a first guest virtual machine located on the host computer system;
    after said intercepting, said processor ascertaining that the second machine is a second guest virtual machine located on the host computer system; and
    in response to said ascertaining, said processor:
        (i) transferring the file from image storage of the first guest virtual machine to an operating system image of the first guest virtual machine,
        (ii) directly transferring the file from the operating system image of the first guest virtual machine to an operating system image of the second guest virtual machine via a virtual machine interconnect bus within the host computer system, and
        (iii) transferring the file from the operating system image of the second guest virtual machine to image storage of the second guest virtual machine.

8. The computer program product of claim 7, said method further comprising:
    in further response to said ascertaining, said processor sending the request to the virtual machine interconnect bus.

9. The computer program product of claim 7, said method further comprising:
    said processor determining whether the second machine is the second guest virtual machine located on the host computer system,
    wherein said determining whether the second machine is the second guest virtual machine located on the host computer system comprises said ascertaining.

10. The computer program product of claim 7, wherein the image storage of the first guest virtual machine and the image storage of the second guest virtual machine are specific to the first guest virtual machine and the second guest virtual machine, respectively.

11. The computer program product of claim 7, wherein the image storage of the first guest virtual machine and the image storage of the second guest virtual machine are different partitions of a data store.

12. The computer program product of claim 7, wherein said hypervisor includes a monitor component, and wherein said processor uses the monitor component to perform said intercepting.

13. A host computer system comprising a processor, a memory, and a computer readable hardware storage device, said storage device containing program code configured to be executed by the processor via the memory to implement a method for transferring data between guest virtual machines, said method comprising:
    said processor intercepting, using a hypervisor, a request to transfer a file from a first machine to a second machine, said first machine being a first guest virtual machine located on the host computer system;
    after said intercepting, said processor ascertaining that the second machine is a second guest virtual machine located on the host computer system; and
    in response to said ascertaining, said processor:
        (i) transferring the file from image storage of the first guest virtual machine to an operating system image of the first guest virtual machine,
        (ii) directly transferring the file from the operating system image of the first guest virtual machine to an operating system image of the second guest virtual machine via a virtual machine interconnect bus within the host computer system, and
        (iii) transferring the file from the operating system image of the second guest virtual machine to image storage of the second guest virtual machine.

14. The system of claim 13, said method further comprising:
    in further response to said ascertaining, said processor sending the request to the virtual machine interconnect bus.

15. The system of claim 13, said method further comprising:
   said processor determining whether the second machine is the second guest virtual machine located on the host computer system,
   wherein said determining whether the second machine is the second guest virtual machine located on the host computer system comprises said ascertaining.

16. The system of claim 13, wherein the image storage of the first guest virtual machine and the image storage of the second guest virtual machine are specific to the first guest virtual machine and the second guest virtual machine, respectively.

17. The system of claim 13, wherein the image storage of the first guest virtual machine and the image storage of the second guest virtual machine are different partitions of a data store.

18. The system of claim 13, wherein said hypervisor includes a monitor component, and wherein said processor uses the monitor component to perform said intercepting.

* * * * *